United States Patent [19]

Janssen et al.

[11] Patent Number: 5,416,514

[45] Date of Patent: May 16, 1995

[54] SINGLE PANEL COLOR PROJECTION VIDEO DISPLAY HAVING CONTROL CIRCUITRY FOR SYNCHRONIZING THE COLOR ILLUMINATION SYSTEM WITH READING/WRITING OF THE LIGHT VALVE

[75] Inventors: Peter Janssen, Scarborough Manor; William Guerinot, Yorktown Heights, both of N.Y.

[73] Assignee: North American Philips Corporation, New York, N.Y.

[21] Appl. No.: 988,617

[22] Filed: Dec. 10, 1992

Related U.S. Application Data

[63] Continuation-in-part of Ser. No. 927,782, Aug. 10, 1992, abandoned, which is a continuation of Ser. No. 634,366, Dec. 27, 1990, abandoned.

[51] Int. Cl.⁶ .................. H04N 9/31; H04N 3/06; H04N 3/08
[52] U.S. Cl. .................. 348/196; 348/761; 348/551; 348/742
[58] Field of Search ............... 348/760, 761, 551, 742, 348/196; H04N 9/31, 3/06, 3/08

[56] References Cited

U.S. PATENT DOCUMENTS

| | | | |
|---|---|---|---|
| 4,139,257 | 2/1979 | Matsumoto | 348/742 |
| 4,978,952 | 12/1990 | Irwin | 348/742 X |
| 5,018,007 | 5/1991 | Lang et al. | 348/742 |
| 5,144,416 | 9/1992 | Hart | 348/742 |

FOREIGN PATENT DOCUMENTS

8907820  8/1989  WIPO .............. H04N 9/31

*Primary Examiner*—James J. Groody
*Assistant Examiner*—Cheryl Cohen
*Attorney, Agent, or Firm*—John C. Fox

[57] ABSTRACT

A color projection video system utilizing only a single light valve. A white light source is separated into into red, green and blue bands. Scanning optics cause the RGB bands to be sequentially scanned across a light valve, such as a transmission LCD panel. Prior to each color passing over a given row of panels on the light valve, that row will be addressed, by the display electronics with the appropriate color content of that portion of the image which is being displayed. The image is projected by a projection lens onto a viewing surface, such as a screen. The device includes circuitry to synchronize the illumination of the light valve with the video signal and to minimize video breakup when changing video sources.

9 Claims, 5 Drawing Sheets

SINGLE PANEL COLOR PROJECTION VIDEO DISPLAY HAVING CONTROL CIRCUITRY FOR SYNCHRONIZING THE COLOR ILLUMINATION SYSTEM WITH READING/WRITING OF THE LIGHT VALVE

CROSS REFERENCE TO RELATED APPLICATION

This application is a continuation-in-part of application Ser. No. 927,782 filed Aug. 10, 1992, now abandoned, which in turn is a continuation of application Ser. No. 634,366 filed Dec. 27, 1990, now abandoned.

BACKGROUND OF THE INVENTION

This invention relates to color video projection systems and particularly to a single light valve panel color projection display having means for preventing picture degradation during channel switching.

Projection television (PTV) and video color display systems, especially rear projection display systems, are a popular way to produce large screen displays, i.e. picture diagonal of 40 inches or greater, as the projection method provides displays which are lighter, cheaper, and in many cases, superior in brightness and contrast, than non-projection based displays. Direct view cathode ray tube (CRT) based systems still dominate non-projection display technology, especially for, 9 inch to 30 inch color displays. In unit and dollar volume, the major market for all such displays is the consumer market. Size, cost, brightness, contrast and to a lesser extent, resolution are important characteristics of consumer designs. Because large direct view CRT based displays are heavier, bulkier, and more expensive, projection consumer displays dominate in sizes over forty inches.

Consumer projection technology has been dominated by a system employing three small monochrome type CRTs, one each for the red, green and blue portions of the image, and three projection lenses. These systems employ complex electronic circuits to distort the rasters of the images on at least two of the CRTs so that the composite projection image is converged. Effecting the proper adjustment of the electronics to obtain the converged image is a time consuming, tedious process. Further maintaining the quality of the convergence in the system after it has been set up at the factory remains an issue.

CRT based projection systems require a stable, source of high voltage, with the attendant requirement of giving careful attention to avoiding excess X-ray generation. The CRTs and projection lenses are not inexpensive components, so the requirement of using three of each add substantially to the cost of the systems. In three CRT-three lens PTV systems, there is also a tendency for the image to change color depending on the horizontal viewing angle—a phenomenon called "color shift". Color shift can be partially controlled by using special projection screen designs. These designs require meeting difficult production tolerances for screen registration and thickness. If not for the requirement of controlling color shift, it would be much easier to design and produce projection screens to provide optimal distribution of light.

With a view toward the advantages of projection systems over direct view, but also some disadvantages, which were just detailed, engineers have been seeking alternative means of designing projection display systems. Accordingly, patents have issued and products have been produced employing three, matrix addressed, small light valve panels, most commonly TFT (thin film transistors) array LCD panels, instead of CRTs. These systems require only a single projection lens, if the light from three LCD panels are combined via the use of dichroic filters, a.k.a. dichroic mirrors. Convergence of the images is obtained by precision adjustment of the alignment of two of the panels. Initial interest in such displays has been their compactness when employed for front projection, and excellent contrast. These LCD panels are costly components, and consequently these LCD projectors cost more than CRT based projectors.

The present invention also differs from "single panel" designs which employ special light valve panels in which separate sub-pixels are used to modulate respective primary colors. Such color panel technologies have three limitations: firstly, the requirement for sub-pixels limits the effective image resolution. Secondly, white light falls on each of the sub-pixels, but only the color of the light for which the sub-pixel is designed is usable—the remainder is wasted. Thus a two-thirds loss of efficiency results. A further loss in efficiency is caused by the reduced effective aperture of the panel for a given polychrome resolution capability—because of the presence of the sub-pixels with attendant masks and traces. Thirdly, state of the art panel resolution is lower, or the panel cost is higher, because of using sub-pixels.

SUMMARY OF THE INVENTION

In the present invention, light from an intense white light source, for example an arc lamp, is collected, and separated using dichroic filters into primary colors—red, green and blue. The color separated light is caused to be formed into three sources, arrayed adjacently, such that each source appears to be narrow in the "vertical" direction and wider in the "horizontal" direction. Scanning optics are employed to cause three bands of light, one of each of the colors, to be positioned onto the rear of a transmissive light valve panel. This panel may be a twisted nematic LCD panel with TFT addressing or other types of light valves. The scanning optics cause the bands of illumination to move across the LCD panel. As a band passes over the "top" of the active area of the panel a band of light of that color again appears at the "bottom" of the panel. Accordingly, there is a continuous sweep of three colors across the panel.

Prior to each color passing over a given row of pixels on the panel, that row will have been addressed with the appropriate information for that color. This means that each row of the panel will be addressed three times for each video field which is to be displayed. This can be accomplished by either using extra addressing lines to the panel array, and writing the horizontal rows in parallel, or by writing three separated rows sequentially, but at three times the field rate. The information being written to the separated rows must be appropriate for the color content of that portion of the image which is being displayed.

Light from the LCD panel is projected by a color corrected projection lens. Alternatively the invention could be used in a direct view mode. Conventional projection screens are useable with the invention. In the case of rear projection systems, screen designs which do not correct for "color shift" are now useable.

The simultaneous use of a large portion of the available red, green and blue light through a single light valve panel is an important feature of the present invention. This means that projection video systems based on the present invention have optical efficiencies at least comparable to that of three panel systems employing the same panel technology. Using only a single panel eliminates the need to mechanically converge the image, and further reduces system cost. Additionally, beam combining dichroic filters are not needed which leads to further cost savings.

The present application is also directed to means for synchronizing the system for illuminating the light valve with the color bands to the video signal. A first synchronization system embodiment utilizes a single phase locked loop control circuit to control the video memory, light valve and color illumination system. A second synchronization system utilizing dual phase locked loop control circuits reduces color breakup to a minimum where more than one unsynchronized video source is used (such as when changing channels on a standard television).

BRIEF DESCRIPTION OF THE DRAWINGS

For better understanding of the invention, reference is made to the drawings which are to be taken in conjunction with the detailed specification to follow.

DESCRIPTION OF THE PREFERRED EMBODIMENTS

Figure 1:
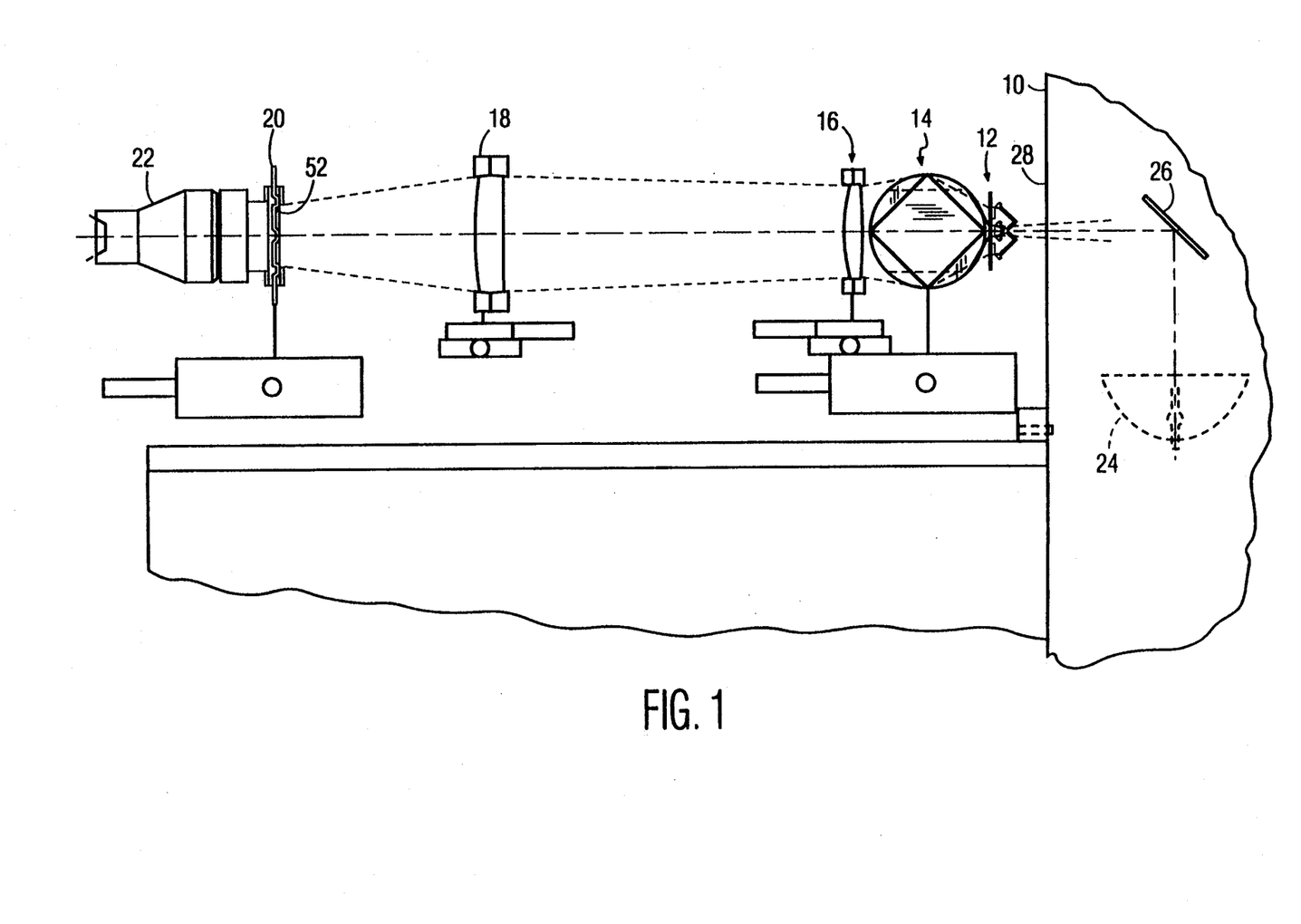
FIG. 1 is a side view of the optical system of the single panel color projection display constructed in accordance with the present invention.

FIG. 1 is a generalized overview of the optical system of the single panel color projection video display which includes a light box 10, a system of dichroic mirrors 12 for splitting the light into bands of red, green and blue, a rotating prism 14 for scanning the RGB bands, relay lenses 16, 18 a light valve 20 upon which is impressed the video signals and a projection lens 22. Light box 10 includes a lamp 24 of any suitable high intensity type such as a xenon arc lamp and on ellipsoidal reflector 25. The lamp output is directed to a "cold" mirror 26 which serves to reflect light in the visible spectrum while passing infra red light. Mirror 26 reflects the light from lamp 24 at a 90° angle and directs it to a series of optical lenses (not shown) which serve to modify the beam of light so that it is in the form of a generally uniform rectangular beam which exits light box 10 through an opening 28. Light box 10 may also include elements for absorbing ultraviolet radiation and cooling lamp 24. Lamp 24 has preferably a short arc length which facilitates its imaging and thus increases the brightness.

Figure 2:
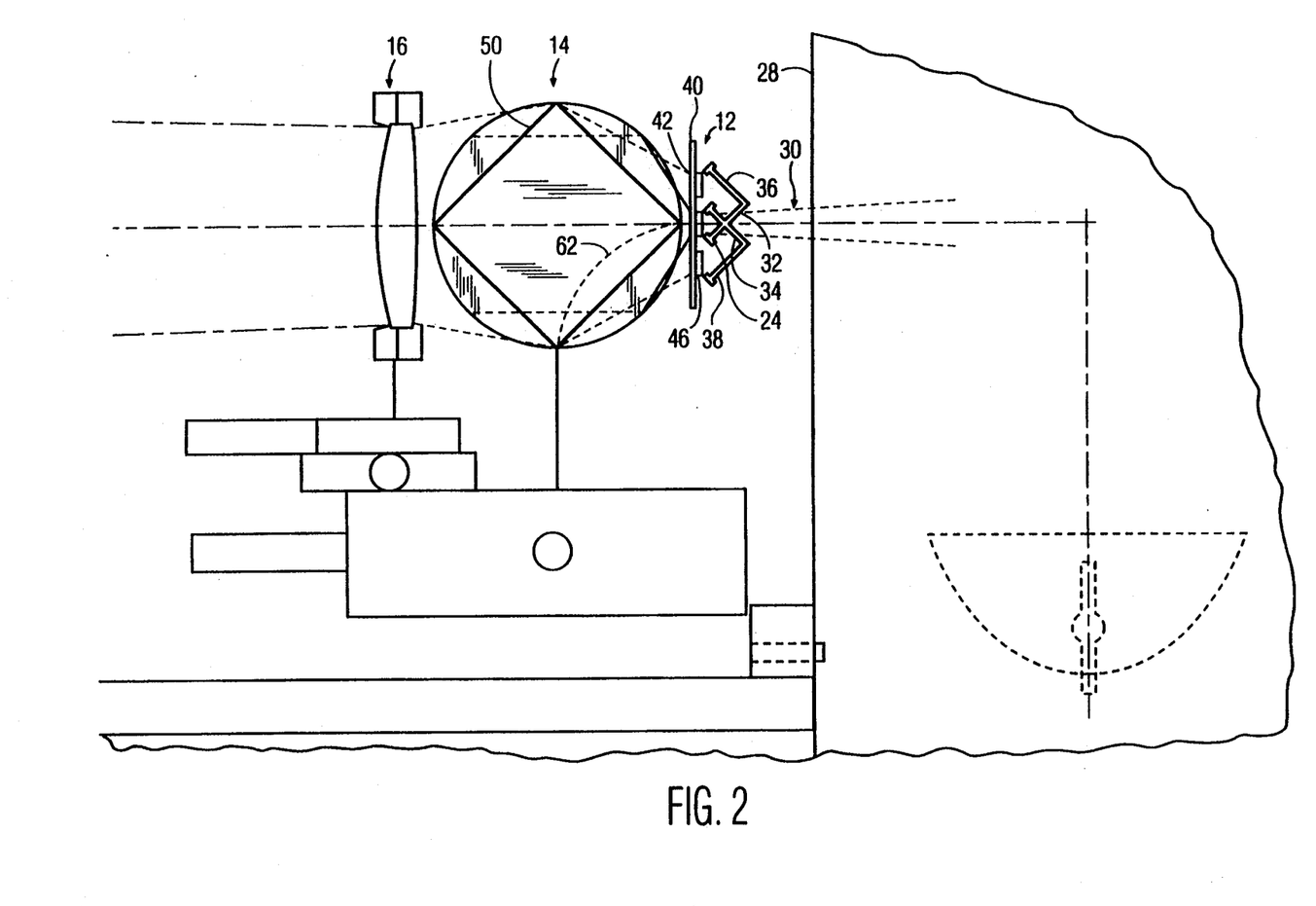
FIG. 2 is a side perspective view of the color separation and scanning mechanism of the present invention.

As is shown in detail in FIG. 2 the beam of light 30 emerging from opening 28 of light box 10 is directed to dichroic mirror system 12. Dichroic mirror system 12 serves to split beam 30 into separate beams of red, green and blue. Dichroic mirror system 12 includes centrally disposed crossed dichroic mirrors 32, 34, which pass only the green light component of beam 30 and reflect red upwardly and blue downwardly to mirrors 36, 38. An upper mirror 36 (which may also be dichroic) is constructed and arranged to reflect the red component of the light impinging thereon and the lower mirror 38 reflects only the blue component of the light impinging thereon. Accordingly, the system of mirrors 32, 34, 36 and 38 serves to split beam 30 into its red, green and blue components which are arranged in the form of a vertical array. A vertical aperture plate 40 includes 3 vertically disposed rectangular apertures 42, 44, 46 which also serve to rectangularize the three RGB light beams exiting the apertures with the red beam on top, the green beam in the middle and the blue beam on the bottom.

After leaving aperture plate 40 the red, green and blue beams impinge upon an optical scanning mechanism in the form of a rotating prism assembly 14. Prism assembly 14 includes a prism member 50 which has four equal flat sides (i.e. its cross section is square) and is rotated about its central longitudinal axis by a motor (not shown) which is driven in synchronicity with the video signals to light valve 20. The action of rotating prism member 50 is to cause the red, green and blue band of colors to be scanned downwardly (or upwardly) in a sequential manner by refraction. The sequentially scanned RGB bands are directed towards light valve 20 by relay lenses 16, 18. Lenses 16 and 18 constitute an anamorphic imaging system (of a 4×1 ratio) which images the light from apertures 42, 44, 46 onto light valve 20. As such, the rectangular active surface of light valve 20, which is a transmission LCD, receives sequential scanning of red, green and blue rectangular color bands. LCD panel 52 modulates the light impinging thereon in accordance with the desired input video information for the colors impinging on its various portions thereon. Thereafter, the video modulated sequential bands of light are projected upon a suitable viewing surface, such as a projection screen, by means of projection lens assembly 22.

The scan linearity of the optical system can be improved to a significant degree by making the surfaces of the revolving prism cylindrically concave as shown in the dotted surface 62 in FIG. 2. The preferred radius of curvature is on the order of 10 inches when the length between adjacent optical facets of the prism is 2.4 inches. For maximum projector performance the use of concave faces is preferred. Negative cylindrical faces can be achieved by direct fabrication (grinding), or by cementing plano-concave cylindrical lenses onto the four faces of a conventional prism. The refractive index of such facing lenses need not be unusually high, but the refractive index of the bulk of the prism should be high (N>1.6). If the refractive index is too low, then rays that otherwise would pass into one facet would exit through an adjacent facet. If this occurs, the phenomenon of total internal reflection (TIR) happens, and the final direction of the existing ray will not be in the proper direction for the light to be useful.

In the electronics for the device, separate red (R), green (G) and blue (B) signals are derived from the appropriate input source (broadcast, cable, direct) as is well known to those skilled in the art. However, in order to drive light valve 20 in accordance with the sequential color bands certain video signal processing is necessary. The parallel RGB signals must be serialized to a serial stream with, for example, the green signal delayed one third of a video field behind the red signal and the blue signal delayed one third of a video field behind the green signal. Thereafter, this serial stream must be processed to conform to the column driver and geometrical arrangement of light valve 20. For example if there are four column drivers there must be four parallel video signals. This signal processing utilizes the drivers of the light valve in a different manner than usually utilized for driving LCD displays. However, the same number and type of drivers are used so that the topology of the light valve need not be radically changed from that used with conventional video displays.

Figure 3:
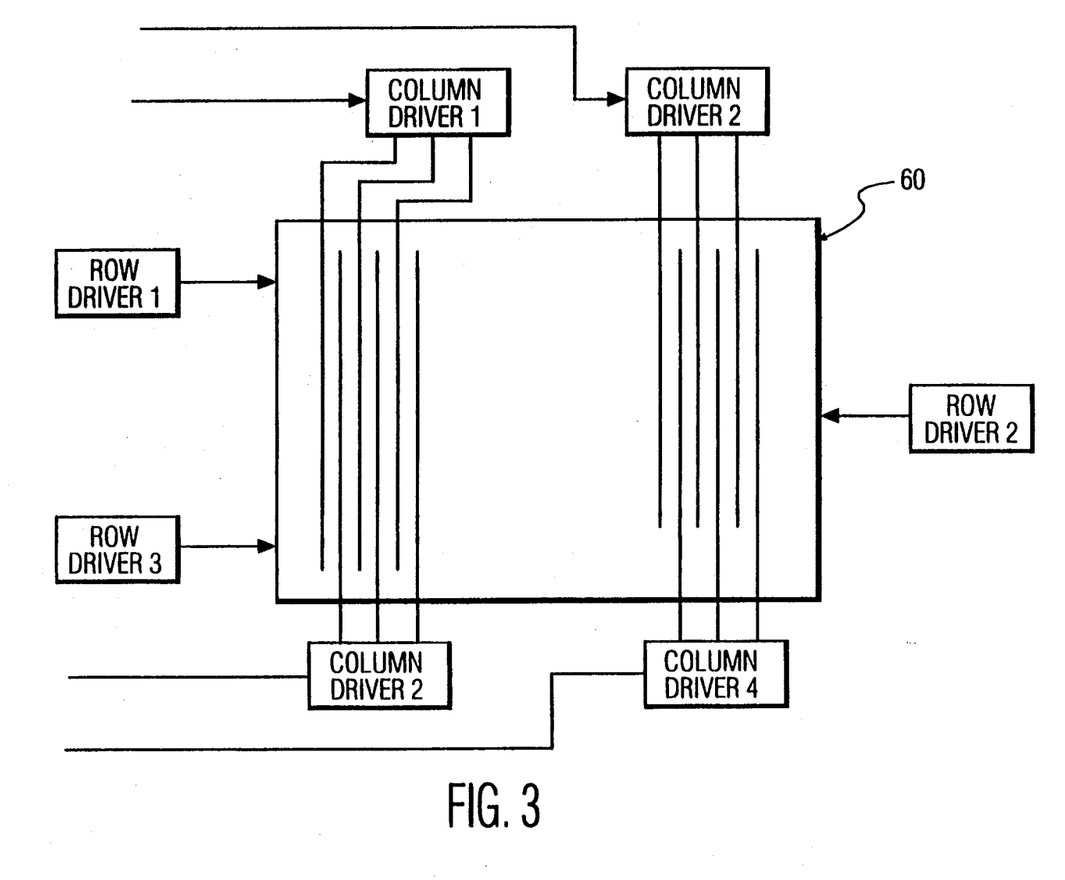
FIG. 3 is a diagram of the drivers of the light valve.

FIG. 3 is a generalized representation of the row and column drivers on a thin film transistor (TFT) LCD array which may be used in accordance with the invention. As is known in this art in such displays the rows are addressed sequentially with all of the TFTs in one row being turned on simultaneously through a common gate line by one of the row drivers R1, R2, R3. The individual pixels in a row are driven by a series of column drivers which may be arranged as illustrated in FIG. 3. The LCD array is laid out such that drivers 1 and 3 are connected to the pixels in odd-numbered columns while drivers 2 and 4 are connected to the pixels in even-numbered columns. The column drivers, which are basically memory devices, sample the incoming video signal and store the sampled value in the respective memory cell.

In standard monochrome operation the column drivers would be loaded in a sequential fashion: During the first half of the video line driver 1 receives all odd pixel values while driver 2 receives all even pixel values. Drivers 3 and 4 store the respective values during the second half of the line. After the video line has been completely written, the outputs of the driver are enabled while at the same time the according row is activated, resulting in a "dump" of the video information onto a specific pixel row on the panel. The whole LCD array is "reprogrammed" in this fashion once per video frame in the sequence video line 1, 2, 3, 4 . . . 478, 479, 480.

In the presented invention a different sequence is required with which the LCD array has to be programmed. The three color bands red, green, and blue are scanning vertically over the panel. During one video frame each row is illuminated by, in this realization, first passing red, then a green and finally a blue lightband. The programming of a particular row has to be performed in a way that e.g. the green values are loaded before the green lightband reaches this row but after the red band has passed by. Since all three color bands are illuminating the panel at any one time three rows have to be programmed during the time of one regular video line. Since the column driver arrangement does not allow independent programming of more than one row at a time this operation has to be performed sequentially.

In case of equally spaced color bands which scan in a strictly linear fashion with no overscan present and 450 rows (video lines) per frame the programming of the LCD panel would be performed in the following sequence (R=red, G=green, B=blue, (xx)=row number):

R(1), G(151), B (301), R(2), G(152), B(302), R(3) . . . R(150), G(300), B(450), R(151), G(301), B(1), . . .

The programming would track the color bands as they move over the panel. The numbers also indicate that the red video information lags 150 lines or ⅓ of a frame behind green which in turn lags ⅓ of a frame behind blue.

In case the rotation of the prism 14 causes non-linear scanning of the color bands, and/or overscan is introduced the timing of the two video signals and sequence will be modified to accommodate the changing scan speed and spatial separation of the color bands. This can be achieved by e.g. varying the system clock for each color according to the respective position on the panel (for the present row-driver arrangement), introducing a varying "blanking" time for the video or changing the line sequence to account for the non-linear behavior (which will require random access programming of the LCD panel rows).

Figure 4:
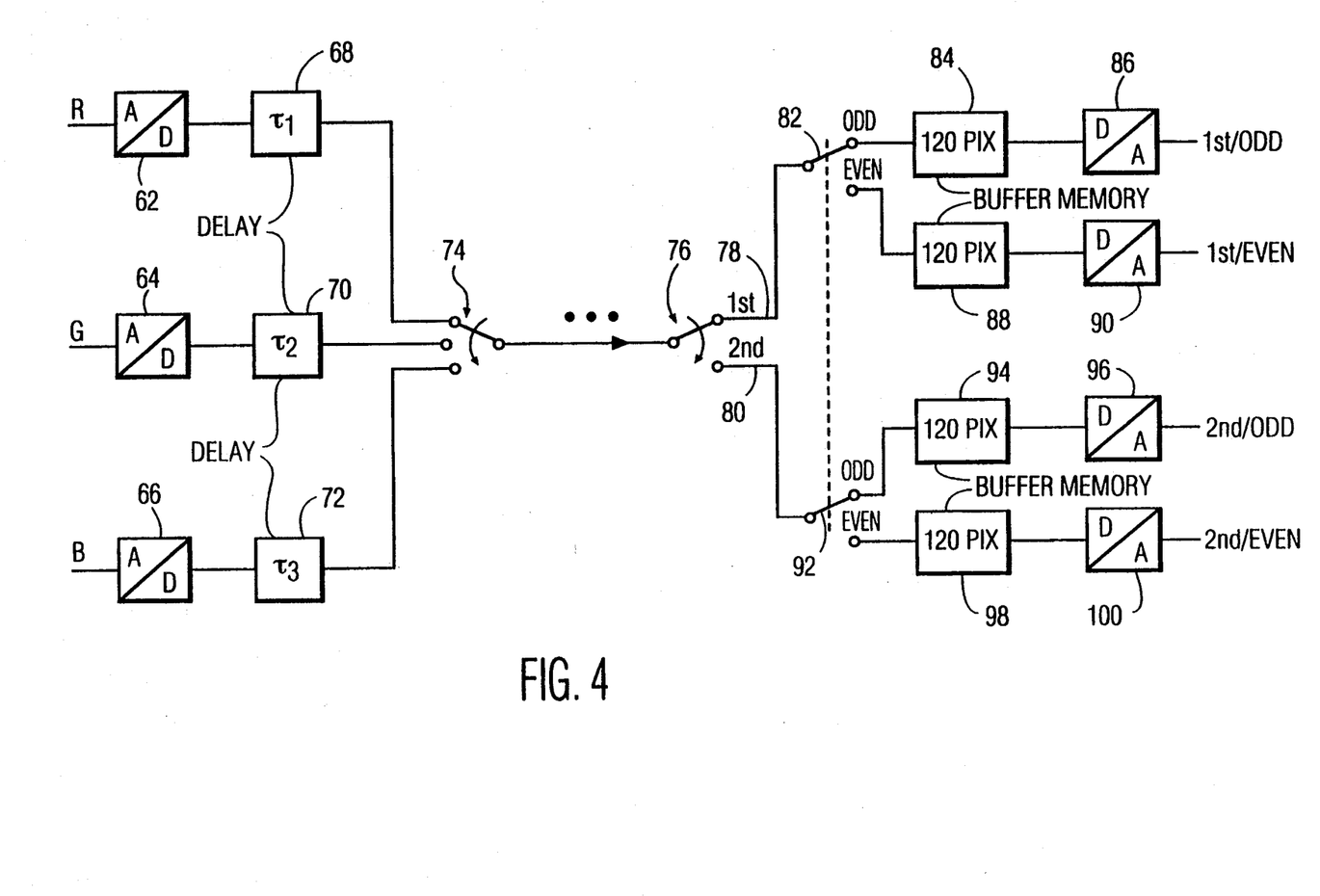
FIG. 4 is a diagram of the processing of the video signals for driving the light valve.

FIG. 4 illustrates the signal processing for the RGB signals in a diagrammatic manner. Each of the signals is input to A/D converters 62, 64 and 66 so that signal processing takes place in digital form. Thereafter the R signal is input to a first delay line 68 which will delay the red signal for a time $\tau_1$. The G signal is input to a delay line 70 which will delay it for a time $\tau_2$ and the blue signal is input to a delay line 72 to delay it a time $\tau_3$. The times $\tau_1$, $\tau_2$, and $\tau_3$ are selected according to the position and scan speed of the respective color band on the panel. Unless the scanning operation is performed completely linearly these delay times will vary during the course of one video frame, both absolutely and relative to each other.

The signals then pass to a switch 74 which selects each of the outputs of the delay circuits 68, 70, 72 sequentially so that the output of switch 74 is a serial stream with, for example, the pixels of the video lines in the aforementioned sequence. Thereafter as described below the signals are input to switching mechanism for applying the serialized delayed stream to the light valve.

The effective threefold increase of the field rate exceeds the speed capabilities of present column drivers. Additional demultiplexing and buffering is used to program the column drivers with four independent and parallel signals, each of which exhibits a data rate of only one quarter of the total rate.

The video stream passes to a switch 76 to separate the video stream into first and second streams 78, 80. Switch 76 is operated at a speed so as to divide the video stream into halves corresponding to the first and second half of each line. Thereafter the output of switch 76 is connected by a line 78 to a switch 82 which is operated at a speed so as to separate the odd and even pixels. The odd pixels are directed to a buffer memory 84 which will hold in this example 120 pixels (one quarter of one line), thereafter the output of buffer memory 84 is output to a D/A converter 86 whose output is in turn directed to column driver 1 as shown in FIG. 3. The even pixel stream is directed to a buffer memory 88 and D/A converter 90 and thereafter to column driver 2 of FIG. 3. The second halves of the video lines carried by line 80 are similarly processed by odd/even switch 92 with the odd pixels directed to buffer 94 and D/A converter 96 to column driver 3. Even pixels are directed through buffer 98 and D/A converter 100 to column driver 4.

It should be kept in mind that the many other components may be substituted for the above described optical system. Other arrangements of components which provide sequential red, green and blue bands across the surface of a light valve may be utilized in conjunction with the present invention. For example, rather than a single source of white light, three sources of appropriately colored red, green and blue light may be utilized in conjunction with a scanning mechanism. Similarly, dichroic mirror system 12 and rotating prism 50 could be replaced by, for example, a rotating wheel of colored filters or a rotating drum of colored filters. Dichroic mirror system 12 could be replaced by a refractory prism and rotating prism 50 could be replaced by a multiple sided polygonal mirror system. The scan direction need not be vertical but could also be horizontal or diagonal (with suitable light valve signal processing).

It is also noted that this invention is utilizable with any type of known electronic light valves such as transmission or reflection LCDs, ferroelectric devices, deformable mirrors and the like. Additionally, the light path could be straight as illustrated or folded in a more compact arrangement. The light valve could also be utilized in a direct view system. In certain applications a two color band rather than three band system could be used. A requirement of the light valve is that it have sufficient switching speed to be switched at more than three times the standard speed for monochrome LCD panels as each pixel of the LCD is at various points in time a red, a green and a blue pixel. Techniques to speed the response time on a LCD include: heating the panel, low viscosity liquid crystal material, high contrast material and/or making the liquid crystal layer thinner. Any combination of these techniques may be used.

Figure 5:
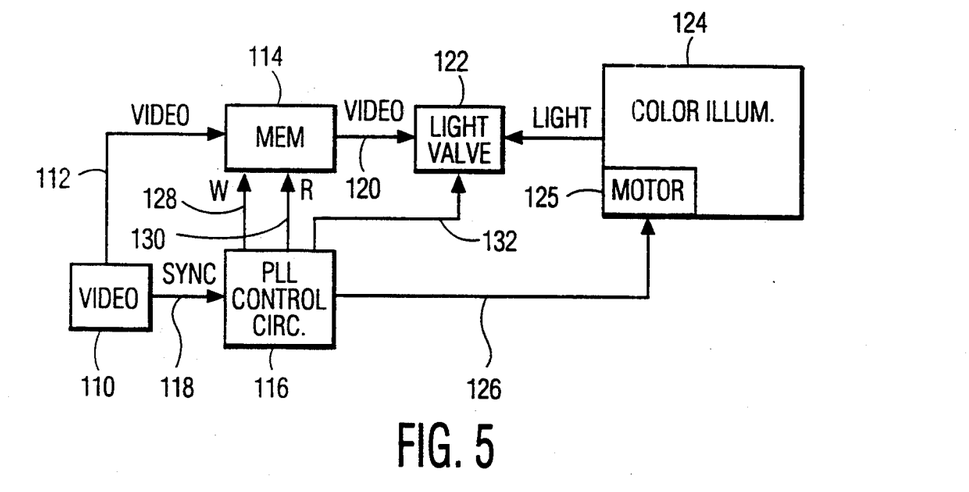
FIG. 5 is a diagrammatic illustration of a first system for providing synchronization between the video signal and the color illumination system.

As described above the control system for the display must provide that the appropriate video information for the particular color impinging on any one line of the display is correct for the color impinging upon that position. Accordingly, the illumination of the light valve by the color bands must be synchronized with that of the video information. Generally, in the driving of light valves the video information of the appropriate color for the line is first loaded into a video memory before, under the control of the read/write control circuitry, being "dumped" to the registers of the light valve. The video memory is generally operated as an analog of the display panel (light valve). FIG. 5 illustrates a first system for synchronization of the video, video memory, read/write control and color illumination system.

FIG. 5 illustrates diagrammatically the control between the video information and the color illumination system in a first embodiment. In the embodiment of FIG. 5 a video source 110 outputs video information 112 to a video memory 114 under control of a phase locked loop (PLL) read/write control circuitry 116 which receives as a control input the sync signal 118 from video source 110. The video information when read out from video memory 114 is delivered through a line 120 to a light valve 122 (which may be a LCD or other type as described above). Also acting upon light valve 122 is a color illumination system 124 which provides the various color light bands to illuminate light valve 122. This illumination system 124 would, in the case of the arrangement illustrated in FIG. 1 through 3 be the system of dichroic filters and rotating prism under the control of a phase lock loop motor 125 whose control signals are output through line 126 from control circuity 116. Motor 125 will adjust the phase (rotational position) of the rotating prism in accordance with output 126. Thus the position of the color bands on light valve 122 is also changed. Control circuit 116 also has control outputs 128, 130 and 132. Output 128 directs the writing of video memory 114, that is the replacement of the old video information with new video information provided through line 112 from video source 110. Output 130 controls the writing of video memory 114 through line 120 to light valve 122. Light valve 122 is instructed to accept the video information supplied by line 120 via output 132 of control circuit 116. Control circuit 116 thus provides an electronic phase locked loop control of video read/write and color illumination functions in response to video sync input 118. The rotation of the prism and thus the position of the color bands upon light valve 114 is thus synchronized to video source 110.

The above described system will maintain synchronization between color illumination system 124 and the video source 110. However, a drawback to the control scheme as set forth in FIG. 5, occurs when video sources are switched, such as by changing channels in a television set. The drawback arises because one video source is not transmitted synchronously with other video sources. Put another way, the start and stop times of the video frames on different television channels (or other video source) are different. Thus, motor 125 driving the prism and the color illumination system 116 must adjust its position so as to become synchronous with the incoming signal. However, since illumination system 124 comprises phase lock loop controlled motor 125 rotating a relatively heavy mechanical device (the prism) it is slower to respond than all electronic video memory 114 and light valve 122. This will cause a breakup of the colors on the screen until such time (usually 1-2 seconds) as the phase (position) of the rotating prism is adjusted. The video source switching breakup can be greatly minimized by the control system illustrated in FIG. 6.

Figure 6:
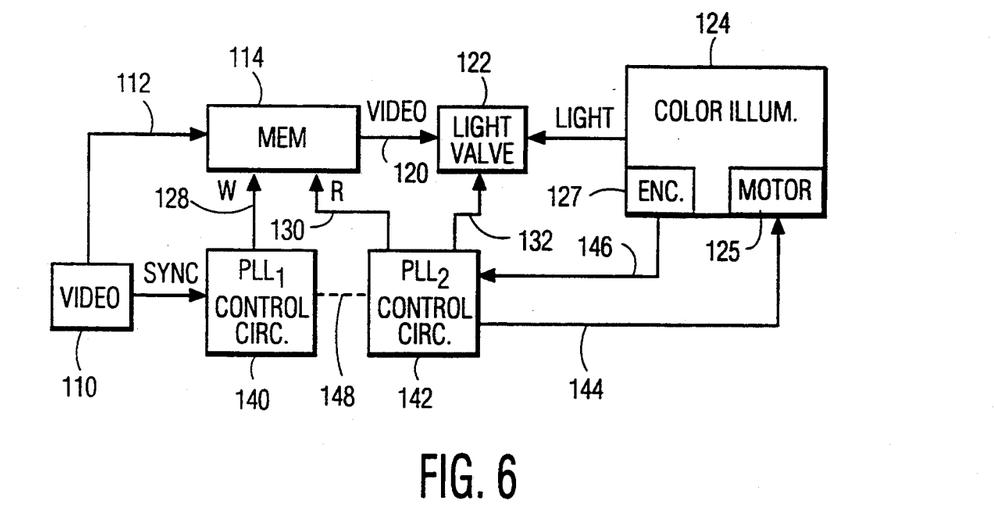
FIG. 6 is a diagrammatic illustration of an second system for providing synchronization between the color illumination system and the video system which minimizes color and video breakup during video source switching.

FIG. 6 illustrates an improved control system which will minimize video breakup during switching of video sources. As is seen in FIG. 6, the video source 110, video memory 114, light valve 122 and illumination system 124 remain the same. Similarly, video input lines 112 and 120 are the same. The control outputs 128 and 130 to video memory and control output 132 to light valve 122 are also the same. The difference in FIG. 6 is that the single control circuit 116 in FIG. 5 has been replaced with two independent phase locked loop control circuits 140 and 142.

The writing to video memory 114 is controlled by a first phase lock loop control circuit 140 which receives its control input from the sync signal of line 118. Control circuit 140 operates on only video memory 114 in response to the video source. Being totally electronic it can respond to changes in video input very quickly, generally within one frame of video. The second control circuit 142 provides read signal 130 to video memory 114 and "accept" control signal 132 to display panel 122. Control circuit 142 has a control output 144 connected to phase lock loop motor 125 of illumination system 124 and receives a control input 146 which provides the actual position (phase) of the rotating prism from a position encoder 127. Control circuit 142 controls the reading from video memory 114 and the writing to light valve 122 in response to the position signal 146 derived from the illumination system 124. Since the rotating prism system is a mechanical system with considerable inertia, the time required for the prism to adjust its position when video sources are changed the response of control circuit 142 is slower than that of control circuit 140. Because of the different response times of control circuits 140, 142 these circuits may be advantageously operated independent of one another (i.e. asynchronously) However, once illumination system 124 and video source 110 have been synchronized, control circuit 142 may be connected to control circuit 140 by means of a line 148 to enable synchronous operation. When line 148 is open control circuits 140, 142 operate asynchronously.

When the video source is stable, the control circuitry of FIGS. 5 and 6 operate identically. It is only during a video source change that a difference in operation is implemented. Because the control loop of the illumination system may operate independently from that of the video memory, the disruption of the video signal during a source transition can be minimized. Electronic phase lock loop control circuits 140, 142 and the motor control phase lock loop circuit 124 are all commercially available items and a variety of such devices may be readily utilized in the above described control system as is known to those skilled in the art.

The apparatus of FIG. 6 permits a video source change protocol which greatly minimizes the amount of picture disruption that a viewer will perceive if the following sequence is utilized between the original stable condition and the transition to a new video source. The arrangement is as follows:

A) Stable condition
  Write timing signal 128 is always coupled to video sync 118
  Read timing signal 130 is coupled to Write timing signal 128 by line 148 interconnecting circuits 140 and 142
  Color illumination system 124 is coupled to Read timing signal 130 by control circuit 142

B) Transition
  Write timing signal 128 is disabled until Control circuit 140 is synchronized to new video source 110. Writing resumes once synchronism has been acquired.
  Read 130 is autonomous initially (Control circuit 142 runs open loop—line 148 is open). Read Restart is derived from illumination system encoder 127.
  Illumination system 124 runs open loop with Feed Forward control through microprocessor or hardware logical circuits. Control signal 144 is arranged to first accelerate, next decelerate motor 125 in a certain direction. The direction of acceleration/deceleration is chosen such that the Vertical phase shift between video and prism is reduced in minimum time.

C) Normalization
  Once vertical phase shift between the video source 110 and the illumination system 124 is small (a few horizontal line periods), Read timing (control circuit 142) is again coupled again to control circuit 140 by line 148.

This transition protocol will minimize the perceived "breakup" of the video signal during channel changing.

Although the present invention has been described in conjunction with preferred embodiments, it is to be understood that modifications and variations may be resorted to without departing from the spirit and scope of the invention, as those skilled in the art will readily understand. Such modification and variations are considered to be within the purview and scope of the invention and the appended claims.

What is claimed is:

1. A system for synchronization of a color projection television system with a video signal comprising:
  a video source having a video output and a synchronization signal;
  video memory means coupled to said video output of said video source;
  light valve means connected to said video memory means;
  an illumination system for moving first, second and third color bands of light across said light valve means;
  a first control circuit having a control output to said video memory means to control the writing of the video to said video memory means in response to the synchronization signal of said video source;
  a second control circuit controlling the writing to said light valve means, said second control circuitry further including means for controlling the position of the color bands in relation to the light valve means and means for receiving an input based on the position of said color bands on said light valve; and
  means for connecting and disconnecting said first and second control circuits from each other so that said first and second control circuits can be operated synchronously when connected and asynchronously when disconnected.

2. The synchronization system as claimed in claim 1 wherein at least one of said first and second control circuits comprise phase lock loop circuits..

3. The synchronization system as claimed in claim 1 wherein said illumination system comprises a rotating prism for moving said color bands across said light valve.

4. The synchronization system as claimed in claim 3 wherein said rotating prism includes a phase lock loop control motor coupled to the output of said second control circuit.

5. The synchronization system as claimed in claim 4 wherein said rotating prism includes an encoder for providing an output representative of the position of the rotating prism.

6. A system for synchronization of a color projection television system having an input video signal having a synchronization signal comprising:
  a video memory for storing a frame of said video signal and connected to a video output of a video source;
  a light valve connected to the video output of said video memory;
  an illumination system for moving color bands of unmodulated light across said light valve to illuminate said light valve and to modulate said bands with said video signal;
  a first control circuit having a control output to said video memory to control the writing of the video signal to the video memory in response to the synchronization signal;
  a second control circuit controlling the writing to said light valve, said second control circuitry further including means for controlling the position of the color bands on the light valve and means for receiving an input from said illumination system based on the position of said color bands on said light valve; and interconnection means for connecting and disconnecting said first and second control circuits from each other so that said first and second control circuits can be operated synchronously when connected and asynchronously when disconnected.

7. A video synchronization system as claimed in claim 6 wherein said first and second control circuits comprise phase locked loops.

8. The video control circuitry as claimed in claim 6 wherein said illumination system comprises rotating means for moving said color bands across said light valve.

9. The video synchronization system as claimed in claim 8 wherein said illumination system includes a phase locked loop control motor having a control input connected to said second control circuit.

* * * * *